United States Patent [19]

Cohen

[11] 4,044,417
[45] Aug. 30, 1977

[54] MOLDING FOOTWEAR LASTS

[75] Inventor: Arnold Cohen, Marblehead, Mass.

[73] Assignee: Jones & Vining, Incorporated, Braintree, Mass.

[21] Appl. No.: 645,547

[22] Filed: Dec. 31, 1975

[51] Int. Cl.² ............................................. A43D 00/00
[52] U.S. Cl. ................................................. 12/146 L
[58] Field of Search ............ 12/133 R, 133 M, 136 R, 12/146 L

[56] References Cited

U.S. PATENT DOCUMENTS

| | | | |
|---|---|---|---|
| 2,330,260 | 9/1943 | Baxter | 12/146 L |
| 3,157,899 | 11/1964 | Bingham | 12/146 L |
| 3,696,456 | 10/1972 | Dunham et al. | 12/146 L |
| 3,724,014 | 4/1973 | Bennett et al. | 12/146 L |

Primary Examiner—Patrick D. Lawson

[57] ABSTRACT

Footwear lasts are molded by preparing an oversized model of the last to be molded; isolating, applying mold release to, and covering with liquid ISP at least first and second surface portions of the model; allowing the ISP cure to form at least first and second mold portions; and using the mold portions to mold plastic lasts.

10 Claims, 10 Drawing Figures

MOLDING FOOTWEAR LASTS

BACKGROUND OF THE INVENTION

This invention relates to molding footwear lasts.

Over the years the wood last has for the most part been replaced by lasts made of high density polyethylene. Typically, high density polyethylene lasts are fabricated by extruding and annealing a polyethylene club, and then carrying out a multi-step machining process to match a wood model. It may be necessary to produce replicate lasts (e.g., anywhere from two to 1,000 or more) corresponding to each of a number of differently sized last models for a production run of a given shoe design. Since many of the individual lasts are often used for very short production runs, the desirability of a low cost last has long been apparent.

Accordingly, many efforts have been made over the years to produce a low cost, high quality, molded plastic last. These efforts have as yet not yielded commercially acceptable results, in part because of high mold costs (particularly when only a few lasts are to be made from a given mold), in part because of the difficulty in finding a material that has the mechanical characteristics needed in a last and is at the same time capable of being molded in thick and irregular sections in economical cycle times.

Further background appears in U.S. Pat. Nos. 2,247,818; 2,521,072; 2,602,193; 2,617,129; 2,678,293; 2,850,752; 3,067,442; and 3,181,186.

Practice of the invention requires use of so-called instant set polymer, a class of material disclosed and claimed in U.S. Pat. No. 3,726,827 (the text of which is hereby incorporated by reference), said class as claimed in said patent being referred to hereinafter as ISP. The chemical structure and methods of making ISP form no part of the present invention. A species (hereinafter referred to as commercial ISP) of instant set polymer is commercially available from The Dow Chemical Company under the trade designation ISP.

SUMMARY OF THE INVENTION

The invention makes possible rapid, low cost fabrication of high quality molds and molded plastic lasts. Any desired number of identical lasts may quickly be made after preparation of a single wood or plastic model and quickly put into production use. Both the molds and the lasts have excellent life and operating characteristics. Excellent dimensional control and stability are achieved.

An important aspect of the invention is the discovery that, surprisingly, ISP is not only an excellent material for molding into lasts, but can also be cast into molds for such lasts.

In general the invention features preparing a oversized model of the ultimately desired last; isolating, applying mold release to, and covering with liquid ISP at least first and second surface portions of the model; allowing the ISP to cure to form at least first and second mold portions; and using the mold portions to mold plastic lasts. Preferably the ISP employed is commercial ISP. In preferred embodiments the lasts themselves are molded from ISP; a time interval is allowed to pass between molding of the first and second mold portions; and the second surface portion of the model, along with the exposed mating face of the first mold portion, are covered with ISP while the model remains embedded in the first mold portion and before substantial cooling and shrinkage thereof has occurred, so that the mating faces of both mold portions will cure and shrink together and then mate accurately.

Other advantages and features of the invention will be apparent from the description and drawings herein of a preferred embodiment thereof.

DESCRIPTION OF THE PREFERRED EMBODIMENT

Figure 1:
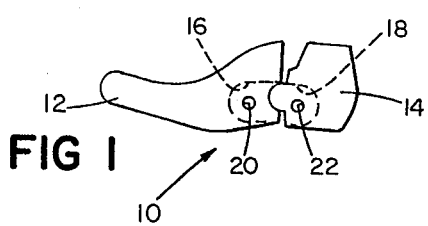
FIG. 1 is a view of a last model.

Referring to the drawings, a model last 10 (FIG. 1) is hand fabricated from conventional materials (e.g., wood, polyethylene), and is sufficiently oversized with respect to the ultimately desired last to allow for the material shrinkage expected to occur during cure of the mold and during the cure of the last itself. Linear and volumetric shrinkage of commercial ISP are about 1-1.5% and 4%, respectively. As shown, the model is of the conventional hinged two piece construction, with the forepart 12 and backpart 14 having routed slots 16 and 18 to accept a hinge link (not shown) and holes 20 and 22 to accept hinge pins (not shown).

Figure 2:
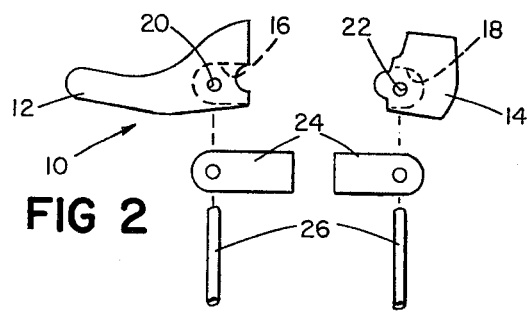
FIG. 2 is an exploded view of the model of FIG. 1.

The model is disassembled (FIG. 2) so that the forepart and backpart portions of the mold will be separate (completely separate molds for the two parts may be made if desired). Metal blanks 24 are inserted in and fill slots 16 and 18; these blanks extend out from their respective slots to provide recesses in the molds, and are eventually installed in those recesses so that the slots 16 and 18 will be molded into the lasts. Overlength pins 26 are inserted in holes 20 and 22 for the same reason. Provision for locating holes, gates, sprues, and the like may also be incorporated into the setup, or may be machined into the mold after casting.

Figure 3A:
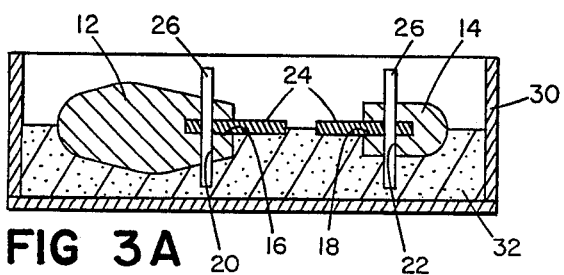
FIG. 3A is a longitudinal vertical sectional view showing the model embedded to half its width in sand.
Figure 3B:
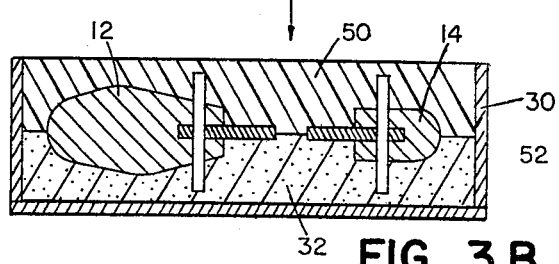
FIG. 3B is a view similar to FIG. 3A additionally showing the mixing and application of liquid ISP to form a first mold half.

Molding box 30 (FIG. 3A) is partially filled with clay, sand, or other easily workable material 32 resistant to ISP and its reaction exotherm. The prepared model parts are embedded to half their width in material 32, so that the mating plane of the mold halves will be the vertical centerplane of the last. Alternative methods of isolating half of the model surface may be employed, such as the use of a sheet metal or plastic partition sealed to the model at its centerplane. The exposed surfaces of the model are sprayed with a conventional mold release.

The above setup is then warmed, preferably to 140°–160° F. Using mixer/dispenser apparatus 40 the components of commercial ISP (a polyol and an isocyanate respectively sold by Dow as Voranol MR222 and Voranate MR111, a catalyst for urethane formation (e.g., stannous octoate), and a modifier (dioctylphthalate precompounded in the isocyanate) are metered, mixed (preferably about 2.7 pts./wt. of isocyanate to 1 pt./wt. of polyol), and dispensed into box 30 to cover all of the exposed model surface with a layer of liquid ISP at least ¼ inch thick. In one example the amount of catalyst used was about ½% by weight of the amount of polyol.

Typical physical properties of the polyol and isocyanate in commercial ISP are:

| Polyol | | Isocyanate | |
|---|---|---|---|
| Hydroxyl Number | 660 | % Free NCO | 18.0 |
| Hydroxyl, % | 20.0 | Viscosity cks, 77° F | 275 |
| Water, % | 0.05 | Viscosity cks, 100° F | 100 |
| Viscosity cks, 77° F | 850 | Specific Gravity 77°/77° F | 1.094 |
| Viscosity cks, 100° F | 280 | Density, lb/gal at 77° F | 9.093 |
| Specific Gravity 77°/77° F | 1.087 | Flash Point (PMCC) | 290° F |
| Density, lb/gal at 77° F | 9.010 | Decomposition | |
| Flash Point, (PMCC) | 380° F | Temperature | 617° F |
| Decomposition | | | |
| Temperature | 725° F | | |

Figure 3C:
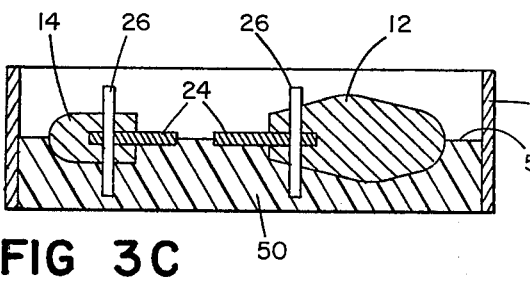
FIG. 3C is a longitudinal vertical sectional view showing the model and first mold half of FIG. 3B inverted.
Figure 3D:
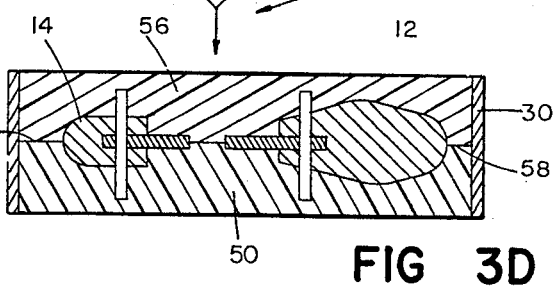
FIG. 3D is similar to FIG. 3C and shows the mixing and application of liquid ISP to form a second mold half.
Figure 3E:
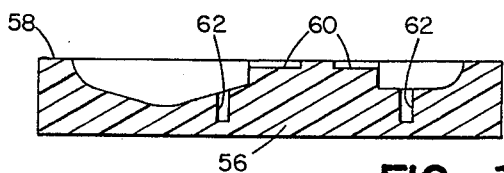
FIG. 3E is a longitudinal vertical sectional view showing the completed mold halves and removal of the model.
Figure 4A:
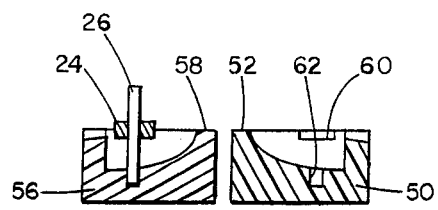
FIG. 4A is a transverse vertical sectional view showing the mold prepared with pins and blanks.
Figures 4B, 4C:
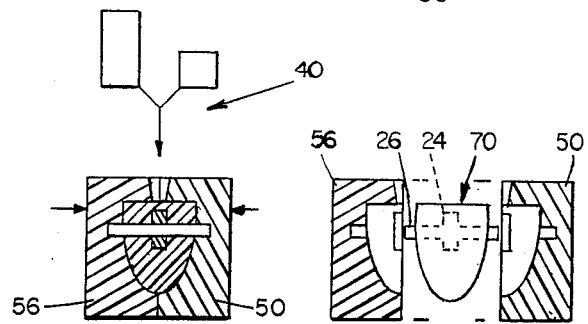
FIG. 4B is a transverse vertical sectional view showing the clamping and filling of the mold.
FIG. 4C is a view similar to FIG. 4B showing the mold opened for removal of the completed last.

About 1 minute is allowed for the ISP to gel (i.e., achieve physical integrity as a solid) to form the first half 50 of the mold. Mold half 50, with the model still embedded therein, is then inverted in box 30 (FIG. 3C). The newly exposed surface of the model and the mating face 52 of mold half 50, are sprayed with mold release and covered with a layer of liquid ISP at least ¼ inch thick to form the second half 56 of the mold (FIG. 3D).

The time interval between casting the first and second halves of the mold should be short enough (preferably no more than 5 minutes) so that substantial cooling and shrinkage of the half 50 does not take place. By casting the mating face 58 of the second half against the substantially uncooled and unshrunk mating face 52 of the first half and then allowing both faces to shrink and cure together, excellent mating of faces 52 and 58 is achieved in operation.

As soon as the mold halves 50 and 56 cool to a temperature suitable for the material from which the lasts are to be molded, they are available for use.

Preferably the lasts themselves are molded from ISP. To reduce the amount of ISP required a small amount of water may be added to produce foaming; alternatively, microballons or other filler material may be added. Blanks 24 and pins 26 are inserted in recesses 60 and 62 of the mold, which is fitted with suitable gating and venting (not shown), sprayed with mold release, clamped, and filled with liquid ISP to cast the last. After about 1 minute the molded last 70 may be removed from the mold. Blanks 24 and pins 26 are removed, and, after cooling and shrinking to the intended size, the last parts are assembled and used.

Other embodiments are within the following claims.
What is claimed is:

1. A method of making molded footwear lasts, comprising the steps of
   preparing an oversized model of the last to be molded,
   isolating, applying mold release to, and covering with liquid instant set polymer (ISP) at least first and second surface portions of said model,
   allowing said ISP to cure to form at least first and second mold portions, and
   using said mold portions to mold plastic lasts.

2. The method of claim 1 further comprising the step of allowing passage of a time interval after covering said first surface portion with liquid ISP, to allow said ISP to gel to form said first mold portion, additional liquid ISP being used to form said second mold portion after passage of said time interval.

3. The method of claim 2 wherein said first mold portion is molded with a mating face transverse to said first surface portion of the model, and said additional liquid ISP is molded against said mating face to provide a corresponding mating face of said second mold portion.

4. The method of claim 3 wherein said time interval is limited to minimize cooling and shrinkage of said first mold portion prior to application of said additional liquid ISP, whereby said mating faces will cool and shrink together.

5. The method of claim 2 wherein said time interval is no longer than five minutes.

6. The method of claim 1 wherein said mold portions are used to mold said last from ISP.

7. The method of claim 1 wherein said surface portions of said model are covered with said liquid ISP to a depth of at least ¼ inch.

8. The method of claim 1 wherein said model is warmed prior to being covered with said liquid ISP.

9. The method of claim 1 wherein said model has a slot to receive a hinge link between the forepart and backpart, an oversized blank is inserted in said slot to produce a recess in said mold, and said blank is inserted in said recess during use of said mold portions as a mold for a last, to mold into said last a slot for said link.

10. A footwear last mold molded according to the method of claim 1.

* * * * *